Figure 1:
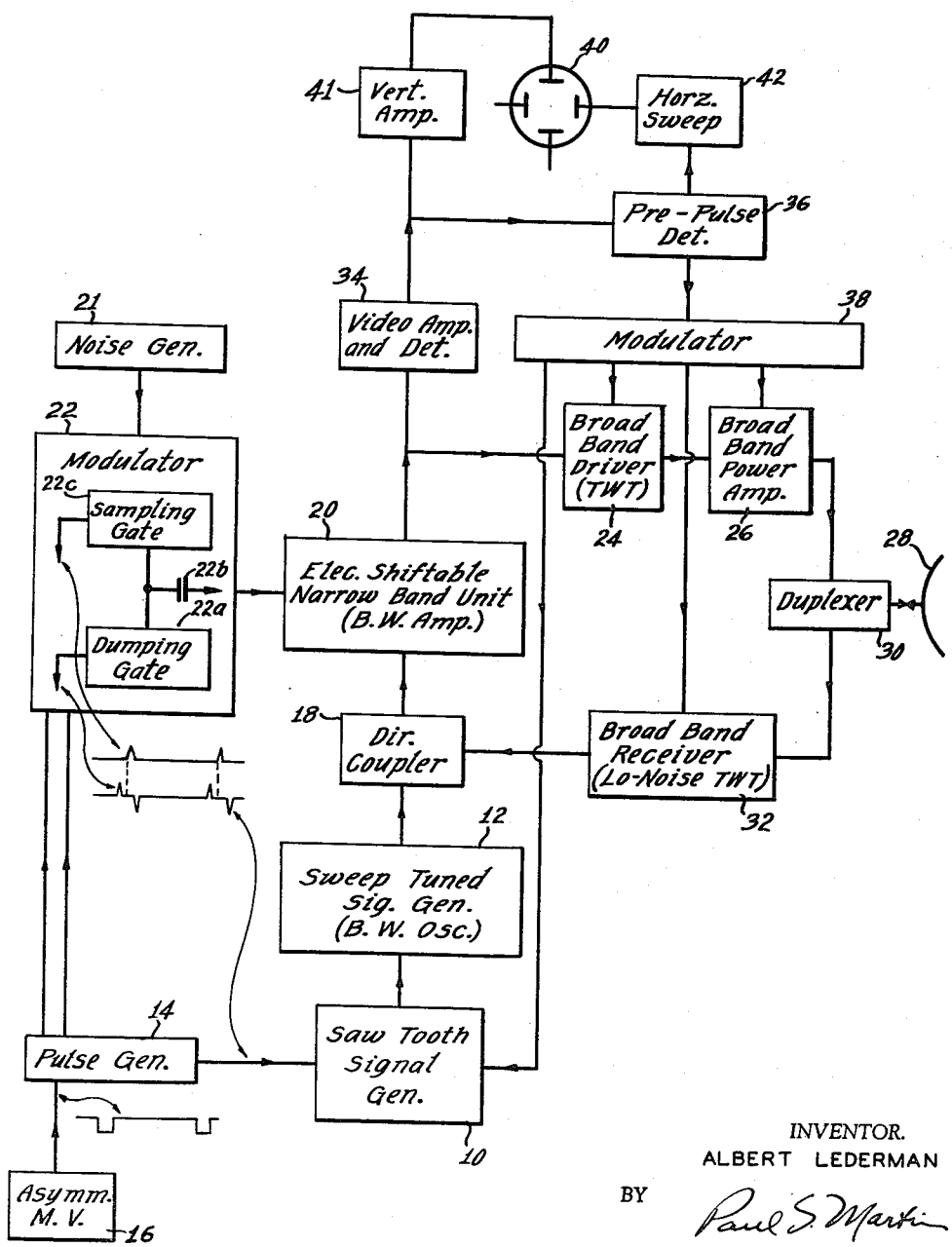

Dec. 10, 1963  A. LEDERMAN  3,114,148
RADAR SYSTEMS
Filed Sept. 9, 1958  2 Sheets-Sheet 1

INVENTOR.
ALBERT LEDERMAN
BY Paul S. Martin
ATTORNEY

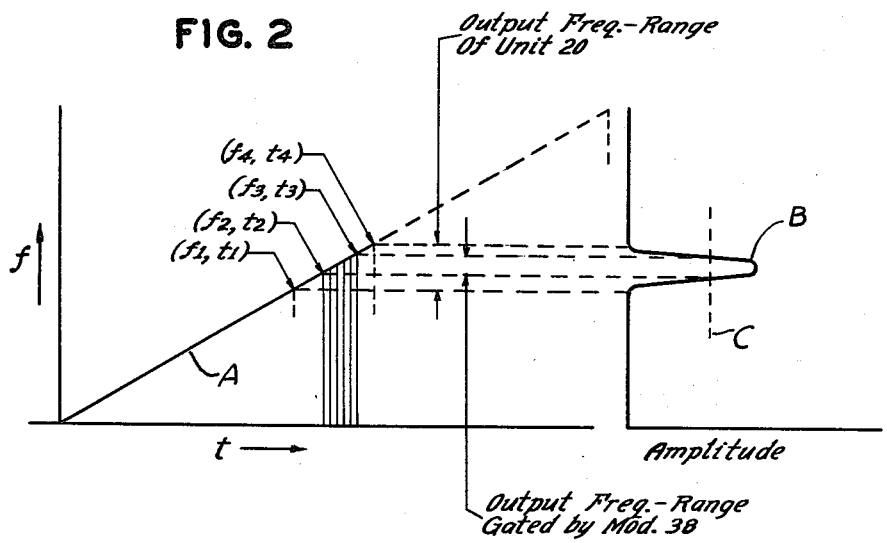
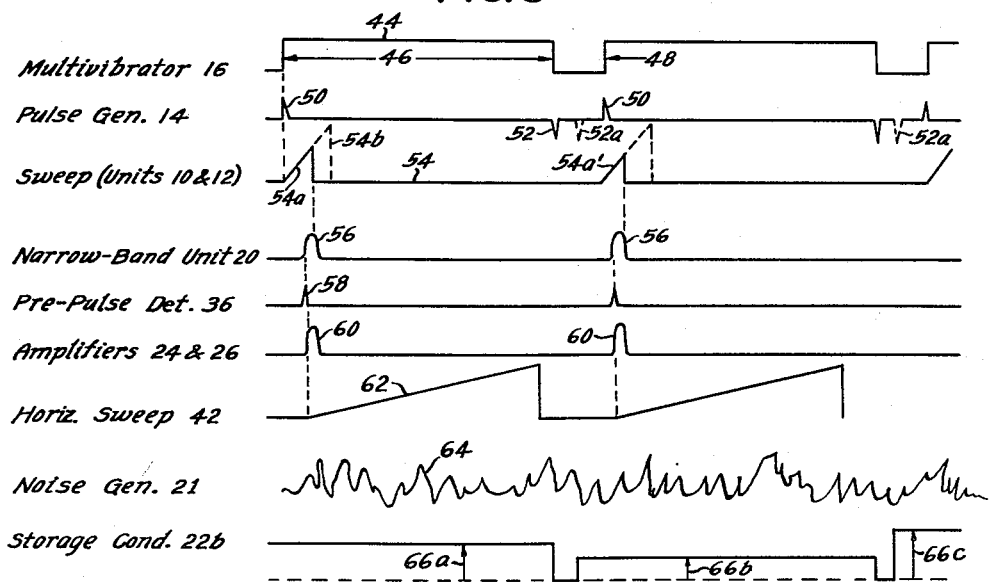

United States Patent Office 3,114,148
Patented Dec. 10, 1963

3,114,148
RADAR SYSTEMS
Albert Lederman, 440 Riverside Drive, New York, N.Y., assignor of one-half to Packard Bell Electronics Corporation, Los Angeles, Calif., a corporation of California
Filed Sept. 9, 1958, Ser. No. 759,982
23 Claims. (Cl. 343—17.1)

The present invention relates to electronic apparatus and, more particularly, to radar.

An object of the invention resides in the provision of a novel frequency-diversity radar, that is, a radar in which successive impulses are of random frequencies. A related object is to provide novel apparatus for producing a series of pulses which have random changes in frequency from each pulse to the next. An important feature of the invention resides in the production of a series of radar pulses by means of tuned apparatus that is also utilized in receiving echo pulses. An important object of the invention resides in the provision of adjustably tuned apparatus useful in producing and receiving such pulses but which changes its tuning at random from each pulse to the next and which retains its tuning during the range in microseconds of a radar system in which it is used. A related broad object is to provide novel random-tuned apparatus useful in such a system.

As is well known, radars send impulses from a transmitter to a reflecting object and receive the pulses, displaying them on a cathode ray screen. The frequency of the radar is usually fixed, or it may be tunable over a limited range. This has prominent disadvantages. A powerful signal tuned to the operating frequency of the radar will jam it. Further, occasional occurrence of frequency-selective atmospheric conditions may disable single-frequency radars.

Through the present invention a radar is provided whose frequency varies from each impulse to the next over a wide frequency range. Impulses of certain frequencies within the range may be blocked by jamming or by atmospheric conditions; but those radar impulses outside the blocked frequencies will still be effective to produce a clear radar display. Power and design limitations make it impractical to produce a broad-band jamming signal to interfere with a broad-band frequency-diversity radar, and the broad-band frequency-diversity radar overcomes narrow-band atmospheric difficulties.

The present invention also provides a novel radar system that is readily tunable to operate at any frequency in a wide band of frequencies.

The radar system which is disclosed in detail below is the presently referred embodiment of the invention in its various aspects. It involves a broad-band transmitter and a broad-band receiver. Impulses are applied to the transmitter by a narrow-band electronically tunable device that has a swept-frequency signal generator at its input. A backward wave amplifier is ideally suitable as the narrow-band device both because of its narrow-band response and because it can be electronically tuned over a broad frequency range. Only a small portion of the applied swept-frequency signal emerges from the narrow-band device. The sweep rate is so fast that the emerging signals appear as an impulse.

The pass-band of the narrow-band device in the illustrative radar can be adjusted to different frequencies in various ways. Where the diversity feature is desired, the pass-band is varied at random under control of sampled voltages from a noise generator. Where it is desired to operate at a constant frequency, selected at any value within a broad range, the noise generator may be replaced by switching to a controlled voltage source, thus providing a widely tunable controlled-frequency radar in which the problem of tracking of the transmitter channel and the receiver channel is minimized by utilizing the same tuned device in both channels. This is an important feature of the invention, in one aspect. In the specifically disclosed embodiment of the invention the backward wave amplifier which is electronically tuned for producing impulses of controlled frequency for the transmitter is also used for selective tuning in the receiver, between a broad-band amplifier and the cathode ray indicator.

A feature of the invention resides in a novel method of producing an impulse, thereafter successively shifting to other impulse frequencies over a broad range. In the illustrative embodiment, this is accomplished by generating a swept-frequency signal, and applying it to a narrow-band-pass device that is capable of being electronically shifted to different parts of the swept-frequency range in producing the successive impulses.

The nature of the invention and various further objects and features will be appreciated from the following description in detail of the presently preferred illustrative embodiment, which is shown in the accompanying drawings. In the drawings:

FIG. 1 is the block diagram of the illustrative embodiment of the invention; and FIGS. 2 and 3 are diagrams illustrating the operation of the apparatus in FIG. 1.

Referring now to the drawings, there is shown in FIG. 1 a block diagram of the presently preferred frequency-diversity radar embodying the various aspects of this invention. A saw-tooth signal generator 10 controls the frequency of an oscillator 12 so as to produce a saw-tooth frequency-modulated output, sweeping through the entire frequency range of the system. Advantageously, the oscillator is of the backward-wave type, and its output frequency is varied by the varying voltage from the signal generator 10 applied to the helix of the backward wave oscillator. The signal of this saw-tooth generator and the sweep of the backward-wave oscillator occurs during a small part of the pulse repetition interval. For example, if the system is designed for a 400-pulse-per-second repetition rate, then each pulse interval is 2,500 microseconds long. The sweep interval of the backward-wave oscillator 12 may, for example, be $1/10$ of that interval or 250 microseconds long. At the end of each saw-tooth sweep (or sooner, as will appear), the swept-frequency operation is interrupted until the start of the next pulse period.

The pulse repetition rate is controlled by an asymmetrical multivibrator 16. This unit controls a pulse generator 14 for triggering on the saw-tooth voltage generator 10. At the end of its sweep, saw-tooth voltage generator 10 is restored to quiescent state, in condition to be triggered once again by pulse generator 14. Means is advantageously provided in the apparatus shown for restoring the saw-tooth voltage generator to its starting state immediately after the transmission of an impulse, almost always before the completion of the full sweep that is possible.

The output of backward wave oscillator 12 is transmitted by directional coupler 18 to a narrow-band tuned amplifier 20. The backward-wave amplifier is eminently effective for this function. It can be tuned electronically to any desired narrow pass-band, over a very broad frequency range. Backward wave amplifier 20 is operable over substantially the same broad frequency range as backward wave oscillator 12; but the characteristic of backward wave amplifier 20 is such that it passes only a very narrow sample of the saw-tooth swept-frequency signal of the backward-wave oscillator. Stated differently, the swept-frequency range is many times the pass-band of the backward-wave amplifier. The latter is electronically shiftable to pass a narrow frequency band at any part of the range of oscillator 10.

The pass-band and hence the output pulse frequency of the backward wave amplifier can be determined by controlling the voltage applied to its electrode system. This can be manually accomplished; and the radar system using pulse source 10—12—20 will then function as a controlled-frequency radar. This may also be accomplished automatically and in random fashion, in providing a frequency-diversity radar.

A random noise generator 21 is provided which feeds a random signal to modulator 22 for the backward-wave amplifier 20. Modulator 22 may assume any convenient form in which a momentary gated sample of the output voltage of the noise generator is stored, as in a condenser, for the duration of each echo-ranging pulse period. The condenser is advantageously gated to discharge and then recharge it to a different sampled voltage taken from the noise generator just prior to each succeeding pulse period. The sampling operation is under the control of pulse generator 14 and may function in the example mentioned above during the final 250 microsecond portion of the 2,500 microsecond pulse repetition period. As a practical consideration, it may be found desirable to employ cascaded gates and successively larger condensers in modulator 22, with successively longer charging times in order to obtain a very short-time sample of the noise signal and to obtain a very stable, constant voltage for controlling backward wave amplifier 20 during each entire echo-ranging period, but such details and refinements of the modulator form no part of the present invention and are omitted in the interest of conciseness.

The portion of the system thus far described represents a device which can be used to provide a series of pulses whose frequencies can either be controlled (if the voltage from modulator 22 is manually adjusted) or the pulse frequencies can be caused to vary from each impulse to the next, in random fashion, where noise generator 21, and a noise-sampling modulator 22 are utilized. During each saw-tooth sweep of frequency in the output of oscillator 12, backward-wave amplifier 20 will remain essentially inactive for most of the time but for some small time, when the swept-frequency signal of the oscillator passes through the narrow-frequency band to which amplifier 20 is tuned, an output pulse will appear. During the sweep its amplitude will vary, corresponding to the shape of the output-frequency characteristic of the narrow-band amplifier device used, and the signal will likewise be frequency-modulated over the narrow range of the amplifier pass-band.

This pulse is applied to a travelling wave tube driver amplifier 24 and to a power amplifier 26, both of which have a broad-band characteristic so as to transmit any frequency that may be produced over the tuning range of unit 20. The output signal pulses are applied via duplexer 30 to antenna 28. Duplexer 30 is here included to minimize the transmission of the pulse power from unit 26 to the low noise travelling wave tube 32 in the receiving channel, to be described.

The characteristic of backward wave amplifier 20 is relatively sharp so as to produce a narrow-band range of output frequencies. The duration of the transmitted pulse could be determined solely by the sweep rate of the backward wave oscillator 10 and the pass-band of the amplifier 20. However, the range of frequencies and the pulse duration of the transmitted signal are advantageously narrowed by suppressing operation of amplifiers 24 and 26, except during a short time when the backward-wave amplifier output is at its peak. For this purpose the output of backward-wave amplifier 20 is applied to a detector and video amplifier 34 whose output is used in a pre-pulse detector 36 for switching on one or more modulators 38 that control the amplifiers 24 and 26; and these same modulators 38 can advantageously be used to supplement duplexer 30 in suppressing the receiver channel 32 during pulse transmission, as represented by the connection of the modulator 38 to the broad-band unit 32.

Operation of the pulse generation portion of the system thus far described is illustrated graphically in FIG. 2. Line A represents the frequency sweep of oscillator 12 as controlled by sweep generator 10. Curve B represents the frequency-amplitude or band-pass characteristic of unit 20. This band pass is of more or less constant width but it can be shifted to different parts of the swept-frequency range of oscillator 12. For a given voltage from modulator 22, the frequencies that are passed by unit 20 are fixed, typically as represented in the diagram. At a time $t_1$ the oscillator frequencies start to emerge from unit 20. At this time modulator 38 is in condition to block broad-band transmitter channel 24, 26. When the signal amplitude rises to a sufficient level as represented by line C, pre-pulse detector 36 shifts the condition of modulator 38 to turn on the transmitter channel, which occurs at a time $t_2$. After a predetermined time, when the pulse amplitude output from unit 20 declines to a given value (as value C) modulator 38 reverts into its condition of blocking channel 24, 26. Modulator 38 is of a design to remain in this blocking condition despite further signals at its input until a fixed time later, equal to the long part of the operation of asymmetrical multivibrator 16. Modulator 38 may also be conditioned by the signal from pulse generator 14 at the start of each oscillator sweep to respond to the next signal from pre-pulse detector 36. The output frequencies $f_2$ to $f_3$ of unit 20 that are passed by transmitter channel 24—26 are represented by the close-spaced vertical lines at the center of the diagram, evidently a short pulse of duration $t_2$ to $t_3$ and having a measure of frequency modulation of $f_2$ to $f_3$. In practice, it is evident that such a short pulse would be accompanied by a spectrum of sideband frequencies, but the major amplitudes of the pulse frequencies still will be in the range indicated.

It is clear from the foregoing that even in the absence of the pre-pulse detector 36 and the modulator 38, the signal emerging from narrow-band unit 20 and applied to the transmitter channel would be a narrow pulse. This is naturally narrowed further by design of unit 24 as by bias or with supplemental threshold limiting circuit detail to respond only to signals above a certain minimum level. Use of the modulator as illustrated is preferred, for pulse-narrowing and for other functions mentioned elsewhere.

Line A representing the swept-frequency range of oscillator 12 is dotted beyond time $t_3$. This is because the oscillator could operate over the whole range but its sweep is here interrupted as soon as the pulse has been produced. This is the result of the connection (FIG. 1) from modulator 38 to saw-tooth sweep generator 10 that interrupts the sweep and restores the signal generator 10 into condition to start its sweep once again under control of pulse generator 14, at the start of the next pulse period.

The transmitted signals in the form of pulses are radiated by antenna 28 (FIG. 1) to be reflected and picked up by antenna 28 as echoes. The received signals are applied via duplexer 30 to low noise amplifier 32 whose design is such as to amplify all frequencies within the freqeuncy range of the system as established by units 12, 20, 24 and 26. The output of amplifier 32 is transmitted through directional coupler 18 to narrow-band unit 20. This device is held in constant tuned condition to pass only the same narrow band of frequencies as contained in the impulse that it previously relayed to amplifiers 24 and 26. With the control voltage of modulator 22 held constant during the transmit-receive interval, the pass band of unit 20 remains in condition to selectively respond to the received echo of the transmitted pulse while rejecting all other frequencies.

The received echo signal transmitted through narrow-band amplifier 20 is applied to the same detector and video amplifier 34 that controls the pre-pulse detector 36; but its amplitude is much lower than that which is needed to operate the pre-pulse detector. The latter may have a limited threshold, or it may include a circuit detail to suppress signals below a certain minimum, so as not to respond to received echo signals. Advantageously the modulator 38 is also of a design to block response of amplifier 24 to echo signals. For this purpose modulator 38 may include a blocking multivibrator that is effective after each transmitted pulse for a time equal to the maximum echo-ranging time; or the modulator may by design remain in blocking condition until conditioned to respond to a pulse from pre-pulse detector 36 by a pulse from pulse generator 14 at the start of each sweep of oscillator 12.

The usual radar display is produced on cathode ray oscilloscope 40. Its vertical deflection system gets its signal through suitable additional amplifiers 41 from the video detector 34. The horizontal sweep of this oscilloscope furnishes the range indication of received impulses. Horizontal sweep oscillator 42 is triggered, as by pre-pulse detector 36, in synchronism with each pulse gated through amplifiers 24 and 26. Unlike usual radars, the horizontal sweep in this system starts at various times after multivibrator 16 starts each pulse period, depending on the time in the sweep of oscillator 12 when amplifier 20 produces a pulse. The fact that the horizontal sweep does not start with each start pulse from pulse generator 14 does not interfere with the range indication provided, and indeed the coordination of the horizontal sweep generator 22 with the transmitted pulse is important to accurate range indication.

The initial pulse that is applied to the transmitting channel amplifiers 24 and 26 is also transmitted through video detector and amplifier 34 to the oscilloscope. Each received echo impulse from receiver-channel amplifier 32 and band-pass unit 20 is displayed on the oscilloscope, displaced along the horizontal time (range) axis. The transmitted impulses appear at the start of the horizontal sweep and each of the echo impulses appear at positions on the screen displaced from the starting point in accordance with the ranges of objects that produced the echo signals.

The operation of the whole system may advantageously be reviewed in connection with the timing diagram of FIG. 3. Curve 44 represents the time division between the two stable states of multivibrator 16, including a long time interval 46 and a short time interval 48. The signal from this multivibrator is converted by pulse generator 14 so as to yield two sets of pulses 50 and 52. Pulses 50 may be termed the "start" pulses, and pulses 52 may be termed the "reset" pulses. The fraction of the pulse-repetition period occupied by the "reset" interval 48 may be 10%, for example.

Pulses 50 start the sweep of the saw-tooth voltage generator 10 and accordingly start the frequency sweep of backward-wave oscillator 12. At this time it will be assumed that the control voltage in modulator 22 has been fixed at some value that determines the narrow pass-band of backward wave amplifier 20. Curve 54 represents the output of saw-tooth generator 10, and this curve also represents the frequency sweep of backward wave oscillator 12 plotted against the horizontal time axis. The sweep 54a of the actual output is shown in solid lines, for the first pulse period illustrated, solid line 54a' representing the actual sweep during the next interval when a different control from modulator 22 is in effect. The dotted line representation 54b indicates the maximum possible sweep of frequency of the oscillator 12 (and the maximum sweep of saw-tooth generator 10). Notably, this sweep is seen to occupy only a small fraction of the interval 46, 10% of the pulse repetition period for example. An assumed pulse repetition rate of 400 pulses per second gives a pulse-repetition period of 2,500 microseconds. This means that the sweep interval is 250 microseconds long; and the previously assumed reset interval 48 (10% of the pulse period) is also 250 microseconds long. This leaves 80% of the pulse repetition period for the transmit-receive or echo ranging time (2,000 microseconds in this example), and a radar range of 1,000 microseconds to the reflecting object is obtained.

Curve 56 represents the output of backward wave amplifier 20 in FIG. 3. During the rise of the output of backward-wave amplifier 20, the pre-pulse detector and amplifier 36 produces a pulse 58, and this triggers modulator 38 so as to render amplifiers 24 and 26 conductive for a shorter time interval, the transmitted pulses being represented by the curve 60. The pre-pulse amplifier also triggers the range sweep deflection system of the cathode ray oscilloscope so that curve 62 represents a voltage variation for the horizontal deflection system of the oscilloscope 40. In the example given for the time division between the saw-tooth generator 10 and the multivibrator 16, the sweep time of range or horizontal sweep generator 62 is limited to 2,000 microseconds, which corresponds to a radiation range of 1,000 microseconds for a transmitted signal to reach the object causing the echo signal.

The transmitted impulse is applied to the vertical plates of the oscilloscope 40 at the same time that the pulse is transmitted by antenna 28 under control of modulators 38; and at the same time the horizontal deflection of the range sweep system for horizontal deflection of the oscilloscope is started. Consequently, when a reflected signal is received and amplified and selected by band-pass unit 20 from the multitude of signals of all frequencies reaching the antenna 28, the range will be indicated on the oscilloscope by the position of the second signal in relation to the indication of the transmitted pulse. The same transmitted pulse naturally may produce multiple reflections from objects at different distances, and these will all appear as impulses on the radar screen, spaced from the display of the transmitted impulse in accordance with the range of the object. This is the same result that is commonly produced in conventional radars in spite of the varied delays between "start" pulses 50 and transmitted pulses 60.

The output of noise generator 61 is represented in FIG. 3 by curve 64. An impulse 52 from pulse generator 14 opens gate 22a to discharge sampling condenser 22b; and during "reset" interval 48 another impulse 52a from the pulse generator 14 opens sampling gate 22c to sample the instantaneous value of random voltages produced by the noise generator. Condenser 22b, charged to such random sampled voltages 66a, 66b and 66c in the successive pulse periods, causes successively different control voltages to be applied to the shiftable narrow-band unit 20. These voltages remain constant throughout the echo-ranging time, as represented in FIG. 3, to maintain the tuning of unit 22 the same during the "receive" interval that it was at the start of each pulse period when it was utilized to determine the frequencies of each of the transmitted pulses.

In connection with the operation of the apparatus in connection with FIG. 2 above, it was noted that the transmitted pulse naturally contains an amount of frequency modulation. If this were considered objectionable, the sweep of the saw-tooth oscillator control unit can be arranged to be arrested by the pre-pulse detector while the oscillator frequency is still within the pass band of the backward wave amplifier. The arrested level of saw-tooth output may be stored, using a sampling-and-storing device such as that in modulator 22. Modulator 38 should be arranged to switch the transmitter "on" when the oscillator sweep is at rest (allowing a brief time interval for the sweep to be arrested) and at the same time that the modulator 38 terminates the transmitted pulse as described above, the modulator can then be used to restore the saw-tooth generator to its normal state.

The foregoing embodiment of the invention described in detail is that presently preferred but is evidently subject to varied modification and substitution of alternative portions for those specifically mentioned. Furthermore, certain novel concepts and portions of the system may be used without taking full advantage of the entire disclosure, and the portions utilized may be readily selected and adapted by those skilled in the art for varied applications. Consequently the invention in its various aspects should be broadly construed, in accordance with its full scope and spirit.

What is claimed is:

1. A radar system, including a narrow-band-pass device, means for applying to said device a signal having a wide range of transmission frequencies including the narrow band of frequencies passed by said device, wide-band transmitting means energized by signals from said narrow-band-pass device, means for receiving reflected echoes of the transmitted signals, and utilization means for the received signals, said system having a transmission path between said receiving means and said utilization means including said narrow-band-pass device.

2. A radar system, including a device having a narrow pass-band, means to impress on said device a wide-band swept-frequency signal including the narrow band of frequencies passed by said device, transmitting means energized by the signal passed by said device, receiving means for reflected echoes of the transmitted signal, and display means for the received echoes, said system having a transmission path between said receiving means and said display means including said narrow-band device.

3. A radar system, including a narrow-band-pass device, means to impress on said device a wide-band swept-frequency signal including the narrow band of frequencies passed by said device, control means for adjustably shifting the pass band of said narrow-band-pass device over a range within the sweep of said swept-frequency signal, transmitting means for relaying the signal from said narrow-band-pass device to a reflecting object and means for receiving the echo therefrom, echo utilization means, and a coupling path between said receiving means and said echo utilization means including said narrow-band-pass device.

4. A radar system, including a device having a narrow pass-band, means to impress on said device a swept-frequency signal having a range that is many times the width of said pass band and including the frequencies of said narrow pass-band, transmitting means energized by the portion of the impressed signal passed by said device, receiving means for the reflections of the transmitted signal, and echo-display means for the received signals, said display means having range sweep means, and a control connection from the output of said narrow band-pass device to said range sweep means for initiating the latter in operation by the signal passed by said device.

5. A radar system, including a device having a narrow pass-band, means to impress on said device a swept-frequency signal including the frequencies of said narrow pass-band, control means for adjustably shifting the pass band of said narrow-band-pass device to operate at different parts of the frequency range of said swept-frequency signal means, broad-band means for relaying the signal passed by said narrow-band-pass device to and from a reflecting object, and echo-display means for the signals reflected from the object, said echo-display means having range sweep-initiating means, and a control connection from the output of said narrow-band-pass device to said range sweep-initiating means to effect control of the latter by the signal passed by said narrow-band-pass device.

6. Pulse generating apparatus, including a device having a narrow pass-band, means to impress on said device a broad-band swept-frequency signal including the narrow band of frequencies passed by said device, and electronic control means for adjustably shifting the pass-band of said narrow-band device to any spot in the range of the swept-frequency signal, said control means including a random signal sampler for changing the control effected by the control means between successive sweeps of the swept-signal impressing means.

7. A radar system including a broad-band transmitter, a broad-band receiver, means for generating frequencies over a broad frequency range, means for selecting a narrow band of said generated frequencies for application to said transmitter, display means for transmitted signals that are reflected as echoes and detected by the receiver, and a transmission path between said receiving means and said display means including said narrow-band selecting means.

8. A radar system including a broad-band transmitter, a broad-band receiver, means for generating signals over a broad frequency range for application to the transmitter, display means for received signals from the receiver, and a backward wave amplifier having a narrow frequency-response range having input connections both to the signal generating means and to the broad-band receiver and having output connections both to the transmitter and to the signal display means.

9. A radar system including a broad-band transmitter, a saw-tooth sweep-frequency signal generator, a backward wave amplifier having a narrow frequency response range interposed between the signal generator and the transmitter for impressing a narrow-band sample of the swept-frequency signal passed by the backward wave amplifier on the transmitter as a pulse, and an adjustable voltage source for controlling the frequency response range of the backward wave amplifier.

10. In a radar, a broad-band transmitter, a narrow-band channel for applying a signal to the transmitter, a sweep-frequency signal generator for applying signals of varying frequency to the narrow-band signal applying means so that an impulse is passed by that narrow-band device, and modulating means controlled by the initial portion of the swept-frequency signal that passes the narrow-band device for rendering the broad-band transmitter operative thereafter to transmit only part of said impulse.

11. A radar system including a broad-band transmitter, a narrow-band-pass device for applying signals to the transmitter, a swept-frequency oscillator coupled to said narrow-band-pass device, means for applying sweep control signal to said oscillator, and periodic timing means for initiating the sweep control signal and to determine the pulse repetition period of the radar system, the sweeping time of said sweep signal applying means being short in relation to the pulse repetition period to cause the swept-frequency oscillator to sweep through its range of frequencies during only a brief fraction of the pulse repetition period.

12. Signal generating means for producing a series of pulses of different frequencies at random, including an electronically shiftable narrow-band-pass device, a broad frequency-range signal source coupled to said narrow-band-pass device, random-varying control means for shifting the pass-band of said device successively to different spots in the range of the broad frequency-range signal source, and means periodically operating said control means to shift the pass band of said device.

13. Apparatus for generating a series of radar impulses of different frequencies at random, including a narrow-band-pass device that is electronically shiftable to different parts of a broad frequency range, a swept-frequency signal source coupled to the input portion of said device, control means coupled in control relation to said narrow-band-pass device including a noise generator and means for periodically sampling the noise generator output and storing the sample, the rate of frequency change of the swept-frequency generator being rapid so that the output of the narrow-band-pass device appears as an impulse.

14. Apparatus for generating a series of radar impulses of different frequencies at random, including a narrow-band-pass device that is electronically shiftable to different parts of a broad frequency range, a swept-frequency signal source coupled to the input portion of said device, control means coupled in control relation to said narrow-band-pass device including a noise generator and means for periodically sampling the noise generator output and storing the sample, the rate of frequency change of the swept-frequency generator being rapid so that the output of the narrow-band-pass device appears as an impulse, and the sweep time being short relative to the impulse repetition period.

15. A radar system including a narrow band-pass device, a transmitting channel and signal-display means coupled to the output portion of said narrow-band-pass device, a receiver channel and a swept-frequency signal source connected to the input portion of said narrow-band-pass device, periodic means for producing a swept-frequency operation of said signal source separated by relatively longer idle intervals, and means synchronized with said periodic means for shifting the pass-band of said device prior to each pulse and for maintaining constant the band-pass during said swept-frequency operation and during each respective ensuing echo-receiving interval.

16. A radar system including a broad-band transmitter, a broad-band receiver, a cathode ray indicator for received signals, an electronically tunable oscillator, means for impressing a series of relatively short saw-tooth control waves on said oscillator separated by relatively long idle intervals, a backward-wave amplifier having a narrow pass-band and provided with input and output connections for relaying signals from the oscillator to the transmitter and for relaying signals from the receiver to the cathode ray indicator, and periodically actuated means synchronized with said saw-tooth control means for changing the pass-band of the narrow-band amplifier immediately prior to each saw-tooth sweep of the oscillator control means, and for maintaining that control nearly until the next saw-tooth sweep is to take place.

17. A radar system including a broad-band transmitter, a broad-band receiver, a cathode ray indicator for received signals, an electronically tunable oscillator, means for impressing a series of relatively short saw-tooth control waves on said oscillator separated by relatively long idle intervals, a backward-wave amplifier having a narrow pass-band and provided with input and output connections for relaying signals from the oscillator to the transmitter and for relaying signals from the receiver to the cathode ray indicator, a pre-pulse detector responsive to the initial portion of the signal passed by said backward wave amplifier, and a modulator having a predetermined brief "on" time for controlling the transmitter in response to said pre-pulse detector and to suppress said transmitter during the remainder of said long idle interval, and periodically actuated means synchronized with said saw-tooth control means for changing the pass-band of the narrow-band amplifier immediately prior to each saw-tooth sweep of the oscillator control means, and for maintaining that control nearly until the next saw-tooth sweep is to take place.

18. A radar system including a narrow-band-pass device, means to impress on said device a signal whose frequency is swept through a wide range including the narrow band of frequencies passed by said device so that said device emits pulses, means including an antenna for relaying signals from said narrow-band-pass device to and from a reflecting object, and utilization means for reflected signals, said system having a coupling path between said antenna and said utilization means, said coupling path including said narrow-band-pass device, and control means for adjustably fixing the pass band of said narrow-band-pass device at any part of a range within the sweep of said swept-frequency signal so as to remain fixed at least throughout a pulse-echo ranging interval.

19. A pulse system including a narrow-band-pass device, means to impress on said device a signal including a wide range of frequencies comprising the narrow band of frequencies passed by said device, means including an antenna for relaying signals from said narrow-band-pass device to and from a reflecting object and arranged to apply the reflected signals to said narrow-band-pass device, keying means controlling the transmission of signals from said narrow-band-pass device to said antenna so as to limit transmission to a sequence of pulses spaced apart by echo-receiving intervals, and adjustable means controlling the pass band of said narrow-band-pass device and effective to fix the pass band thereof for a time interval including at least one of said pulses and a succeeding echo-receiving interval.

20. A pulse system, including a narrow-band-pass device, means to provide and impress on said device a signal containing a wide range of frequencies including the narrow band of frequencies passed by said device, means including an antenna coupled to said device for relaying signals from said device to a reflecting object and for applying reflected signals from said object to said device, control means fixing the pass band of said device at a narrow band within said range, and periodic means for shifting the control effected by said control means.

21. A pulse system, including broad-band transmitting means, broad-band receiving means, an antenna, a duplexer interposed as a coupling between said transmitting means, said receiving means, and said antenna, and a narrow-band-pass device having an input portion coupled to said receiving means and an output portion coupled to said transmitting means.

22. A pulse system, including transmitting means, receiving means, an antenna, a duplexer interposed as a coupling between said transmitting means, said receiving means, and said antenna, a narrow-band-pass device having an input portion coupled to said receiving means and an output portion coupled to said transmitting means, a signal source, and a directional coupler having respective input branches coupled to said receiving means and said signal source and an output branch coupled to said narrow-band-pass device.

23. In combination, a backward wave amplifier having a narrow frequency-response range, said amplifier having respective input and output portions, a broad-band receiver, signal generating means providing a broad range of frequencies including that of said backward wave amplifier, a directional coupler having input branches to said broad-band receiver and to said signal generating means and having an output branch coupled to said input portion of said backward wave amplifier, and cathode-ray display means and a broad-band transmitter both coupled to said output portion of said backward-wave amplifier.

References Cited in the file of this patent

UNITED STATES PATENTS

| | | |
|---|---|---|
| 2,403,986 | Lacy | July 16, 1946 |
| 2,489,273 | Dodington | Nov. 29, 1949 |
| 2,522,367 | Guanella | Sept. 12, 1950 |
| 2,603,744 | Larson | July 15, 1952 |
| 2,671,850 | Marcou | Mar. 9, 1954 |
| 2,782,380 | Coate et al. | Feb. 19, 1957 |
| 2,842,764 | Harvey | July 8, 1958 |
| 2,931,978 | Erdman | Apr. 5, 1960 |